United States Patent
Nair et al.

(10) Patent No.: US 12,363,560 B2
(45) Date of Patent: Jul. 15, 2025

(54) APPARATUSES AND METHODS FOR COLLABORATIVE LEARNING

(71) Applicant: Nokia Solutions and Networks Oy, Espoo (FI)

(72) Inventors: Divya G Nair, Kerala (IN); Anatoly Andrianov, Schaumburg, IL (US); Rakshesh Pravinchandra Bhatt, Bangalore (IN); Konstantinos Samdanis, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 246 days.

(21) Appl. No.: 18/170,090

(22) Filed: Feb. 16, 2023

(65) Prior Publication Data

US 2023/0262489 A1    Aug. 17, 2023

(30) Foreign Application Priority Data

Feb. 17, 2022   (IN) .............................. 202241008435

(51) Int. Cl.
*H04W 24/02* (2009.01)
*G16Y 30/00* (2020.01)
*H04L 41/16* (2022.01)

(52) U.S. Cl.
CPC .............. *H04W 24/02* (2013.01); *G16Y 30/00* (2020.01); *H04L 41/16* (2013.01)

(58) Field of Classification Search
CPC ......... H04W 24/02; G16Y 30/00; H04L 41/16
See application file for complete search history.

(56) References Cited

U.S. PATENT DOCUMENTS

| | | | |
|---|---|---|---|
| 11,080,620 B2 * | 8/2021 | Ba | G06N 20/00 |
| 2021/0216890 A1 * | 7/2021 | Hulugundi | G06N 20/00 |
| 2022/0083856 A1 * | 3/2022 | Yaguchi | G06N 3/045 |
| 2022/0398500 A1 * | 12/2022 | Singhal | G06N 3/098 |
| 2023/0376574 A1 * | 11/2023 | Igarashi | H04L 9/50 |
| 2024/0249184 A1 * | 7/2024 | Hoogerbrugge | G06N 20/00 |

FOREIGN PATENT DOCUMENTS

| | | | | |
|---|---|---|---|---|
| WO | WO-2021055851 A1 * | 3/2021 | | A61F 2/60 |
| WO | WO-2022085420 A1 * | 4/2022 | | G06F 21/1074 |

OTHER PUBLICATIONS

"3rd Generation Partnership Project; Technical Specification Group Services and System Aspects; Management and orchestration; Self-Organizing Networks (SON) for 5G networks (Release 17)", 3GPP TS 28.313, V17.2.0, Sep. 2021, pp. 1-54.

(Continued)

*Primary Examiner* — Michael A Keller
(74) *Attorney, Agent, or Firm* — SQUIRE PATTON BOGGS (US) LLP

(57) ABSTRACT

A server (12) comprising means (123) for:
  generating at least one updated set of model parameters based on at least one current set of model parameters received from at least one apparatus (100-*n*), the at least one updated set of model parameters being parameters of a machine learning model and being an update of the at least one current set of model parameters;
  sending the at least one updated set of model parameters to at least one apparatus (100-*n*).

15 Claims, 5 Drawing Sheets

(56) References Cited

OTHER PUBLICATIONS

"3rd Generation Partnership Project; Technical Specification Group Services and System Aspects; Management and orchestration; Management Data Analytics (MDA) (Release 17)", 3GPP TS 28.104, V0.2.0, Oct. 2021, 24 pages.

"New SID on Federated learning for mobile network management", 3GPP TSG-SA5 Meeting #139-e, S5-215181, Agenda Item: 6.2, China Mobile, Oct. 11-20, 2021, 3 pages.

"3rd Generation Partnership Project; Technical Specification Group Services and System Aspects; Management and orchestration; Study on enhancement of Management Data Analytics (MDA) (Release 17)", 3GPP TR 28.809, V17.0.0, Mar. 2021, pp. 1-96.

"New SID on 5G System Support for AI/ML-based Services", 3GPP TSG-SA Meeting #94e, SP-211648, Agenda Item: 7.4, OPPO, Dec. 14-20, 2021, 5 pages.

* cited by examiner

APPARATUSES AND METHODS FOR COLLABORATIVE LEARNING

TECHNICAL FIELD

Various example embodiments relate generally to apparatuses, methods, and computer program products for collaborative learning.

BACKGROUND

Machine learning (ML) models are applied in various data-driven systems and applications to provide intelligent processing of ever-increasing amounts of data. In the era of the new generation of communication systems, the remarkable growth in data traffic and the continuous emergence of new applications of communications bring forward an inevitable need for more intelligent processing, operation, and optimization of communication networks by integrating machine learning that carries artificial intelligence into the design, planning, and optimization of the communication networks.

Standard machine learning approaches require centralizing the training data on one machine or in a centralized cloud.

Federated learning is an example of decentralized machine learning techniques that enable end devices to collaboratively learn a shared model while keeping all the training data stored on or available at the end devices.

Existing implementations of decentralized machine learning solutions face several challenges. Indeed, with limited computation capabilities and a limited view of data, the end devices implementing ML-based solutions can have compromised accuracy levels, leading to inaccurate decisions. On the other hand, implementing ML-based solutions at the centralized cloud can be much more accurate because of having ample computation and data exposure. However, such an improved accuracy is obtained with an increased latency that can impact the real-time decision-making capabilities of the end devices.

There is accordingly a need for improved decentralized machine learning techniques.

SUMMARY

The scope of protection is set out by the independent claims. The embodiments, examples, and features, if any, described in this specification that do not fall under the scope of the protection are to be interpreted as examples useful for understanding the various embodiments or examples that fall under the scope of protection.

In a first aspect, there is provided a server comprising means for:
  generating at least one updated set of model parameters based on at least one current set of model parameters received from at least one apparatus, the at least one updated set of model parameters being parameters of a machine learning model and an update of the at least one current set of model parameters;
  sending the at least one updated set of model parameters to at least one apparatus.

In an embodiment, the means for generating the at least one updated set of model parameters include means for performing a centralized processing based on two or more current sets of model parameters received from two or more corresponding apparatuses.

In an embodiment, the means are configured to group the two or more apparatuses into one or more clusters, the means being configured to generate at least one updated set of model parameters per cluster of apparatuses.

In an embodiment, the means are configured to generate the at least one updated set of model parameters by applying a weighted average to the two or more current sets of model parameters using two or more weighting coefficients, the means being further configured to generate the weighting coefficient applied to one set of current model parameters received from one apparatus based on one or more of an accuracy value, analytics data, and a number of training samples received from the one apparatus, the accuracy value representing an accuracy of the machine learning model configured with the one set of current model parameters and trained based on the training samples, the analytics data being obtained from inference data generated at output of two or more trained machine learning models configured respectively with the two or more current sets of model parameters.

In an embodiment, the means are configured to generate an updated accuracy value representing an accuracy of the machine learning model configured with the at least one updated set of model parameters, the means being further configured to determine a time to send the at least one updated set of model parameters to the at least one apparatus based on one or more of the updated accuracy value, a number of the at least one current set of model parameters, and a model update timer.

In an embodiment, the means are configured to generate the at least one updated set of model parameters for at least one machine learning use-case, the means being configured to send the at least one updated set of model parameters to at least one apparatus in response to a subscription request sent by the at least one apparatus to receive one or more updated sets of model parameters for the machine learning use-case.

In a second aspect, there is provided an apparatus comprising means for:
  sending a current set of model parameters to a server, the current set of model parameters being parameters of a trained machine learning model;
  configuring the trained machine learning model with an updated set of model parameters received from the server, the updated set of model parameters being an update of the current set of model parameters.

In an embodiment, the means are configured to:
  obtain an accuracy value representing an accuracy of the trained machine learning model configured with the current set of model parameters;
  determine a time for sending the current set of model parameters to the server based on one or more of the accuracy value and a model update timer.

In an embodiment, the means are configured to obtain the current set of model parameters from a training of a machine learning model performed based on training samples, the means being configured to send to the server at least one of: the accuracy value, analytics data, one or more formats of input data, a feature extraction algorithm, one or more data pre-processing techniques, and a number of the training samples used for training the machine learning model, the analytics data being obtained from inference data generated by running the trained machine learning model configured with the current set of model parameters using the input data.

In an embodiment, the machine learning model is implemented for a machine learning use-case, the means being configured to send a subscription request to receive from the server at least one updated set of model parameters for the machine learning use-case.

In an embodiment, the apparatus is a distributed self-organizing network apparatus operable at a wireless edge of a wireless communication system, the means being configured to perform one or more operations by running the trained machine learning model configured with the updated set of model parameters, an operation being a radio access network optimization operation at the wireless communication system.

In an embodiment, the subscription request comprises an identifier of a use-case specific classification algorithm.

In an embodiment, the apparatus is an Internet of Things device.

In a third aspect, there is provided a method for use at a server, the method comprising:
receiving at least one current set of model parameters from at least one apparatus, the at least one current set of model parameters being parameters of a machine learning model;
generating at least one updated set of model parameters based on the at least one current set of model parameters, the at least one updated set of model parameters being an update of the at least one current set of model parameters;
sending the at least one updated set of model parameters to at least one apparatus.

In a fourth aspect, there is provided a method for use at an apparatus, the method comprising:
sending a current set of model parameters to a server, the current set of model parameters being parameters of a trained machine learning model;
receiving an updated set of model parameters from the server, the updated set of model parameters being an update of the current set of model parameters;
configuring the trained machine learning model with the updated set of model parameters.

In a fifth aspect, there is provided a non-transitory computer-readable medium storing computer-executable instructions that, when executed by at least one processor at an apparatus, cause the apparatus to perform the method for use at the server as disclosed herein.

Generally, the server comprises means for performing one or more or all steps of the method for use at the server as disclosed herein. The means include circuitry configured to perform one or more or all steps of the method. The means may include at least one processor and at least one memory including computer program code, the at least one memory and the computer program code being configured to, with the at least one processor, cause the server to perform one or more or all steps of the method for use at the server as disclosed herein.

In a sixth aspect, there is provided a non-transitory computer-readable medium storing computer-executable instructions that, when executed by at least one processor at an apparatus, cause the apparatus to perform the method for use at an apparatus as disclosed herein.

Generally, the apparatus comprises means for performing one or more or all steps of the method for use at an apparatus as disclosed herein. The means include circuitry configured to perform one or more or all steps of the method. The means may include at least one processor and at least one memory including computer program code, the at least one memory and the computer program code being configured to, with the at least one processor, cause the apparatus to perform one or more or all steps of the method for use at an apparatus as disclosed herein.

In a seventh aspect, there is provided an apparatus comprising
at least one processor, and
at least one memory including computer program code;
the at least one memory and the computer program code configured to, with the at least one processor, cause the apparatus at least to perform:
generating at least one updated set of model parameters based on at least one current set of model parameters received from at least one apparatus, the at least one updated set of model parameters being parameters of a machine learning model and an update of the at least one current set of model parameters;
sending the at least one updated set of model parameters to at least one apparatus.

In an embodiment, the at least one memory and the computer program code are configured to, with the at least one processor, cause the apparatus to perform a centralized processing based on two or more current sets of model parameters received from two or more corresponding apparatuses.

In an embodiment, the at least one memory and the computer program code are configured to, with the at least one processor, cause the apparatus to group the two or more apparatuses into one or more clusters and to generate at least one updated set of model parameters per cluster of apparatuses.

In an embodiment, the at least one memory and the computer program code are configured to, with the at least one processor, cause the apparatus to generate the at least one updated set of model parameters by applying a weighted average to the two or more current sets of model parameters using two or more weighting coefficients, the at least one memory and the computer program code being configured to, with the at least one processor, cause the apparatus to generate the weighting coefficient applied to one set of current model parameters received from one apparatus based on one or more of an accuracy value, analytics data, and a number of training samples received from the one apparatus, the accuracy value representing an accuracy of the machine learning model configured with the one set of current model parameters and trained based on the training samples, the analytics data being obtained from inference data generated at output of two or more trained machine learning models configured respectively with the two or more current sets of model parameters.

In an embodiment, the at least one memory and the computer program code are configured to, with the at least one processor, cause the apparatus to generate an updated accuracy value representing an accuracy of the machine learning model configured with the at least one updated set of model parameters, the at least one memory and the computer program code being configured to, with the at least one processor, cause the apparatus to determine a time to send the at least one updated set of model parameters to the at least one apparatus based on one or more of the updated accuracy value, a number of the at least one current set of model parameters, and a model update timer.

In an embodiment, the at least one memory and the computer program code are configured to, with the at least one processor, cause the apparatus to generate the at least one updated set of model parameters for at least one machine learning use-case, the at least one memory and the computer program code being configured to, with the at least one processor, cause the apparatus to send the at least one updated set of model parameters to at least one apparatus in response to a subscription request sent by the at least one apparatus to receive one or more updated sets of model parameters for the machine learning use-case.

In an eighth aspect, there is provided an apparatus comprising at least one processor, and at least one memory including computer program code;

the at least one memory and the computer program code configured to, with the at least one processor, cause the apparatus at least to perform:

sending a current set of model parameters to a server, the current set of model parameters being parameters of a trained machine learning model;

configuring the trained machine learning model with an updated set of model parameters received from the server, the updated set of model parameters being an update of the current set of model parameters.

In an embodiment, the at least one memory and the computer program code are configured to, with the at least one processor, cause the apparatus to:

obtain an accuracy value representing an accuracy of the trained machine learning model configured with the current set of model parameters;

determine a time for sending the current set of model parameters to the server based on one or more of the accuracy value and a model update timer.

In an embodiment, the at least one memory and the computer program code are configured to, with the at least one processor, cause the apparatus to obtain the current set of model parameters from a training of a machine learning model performed based on training samples, the at least one memory and the computer program code being configured to, with the at least one processor, cause the apparatus to send to the server at least one of: the accuracy value, analytics data, one or more formats of input data, a feature extraction algorithm, one or more data pre-processing techniques, and a number of the training samples used for training the machine learning model, the analytics data being obtained from inference data generated by running the trained machine learning model configured with the current set of model parameters using the input data.

In an embodiment, the machine learning model is implemented for a machine learning use-case, the at least one memory and the computer program code being configured to, with the at least one processor, cause the apparatus to send a subscription request to receive from the server at least one updated set of model parameters for the machine learning use-case.

BRIEF DESCRIPTION OF THE DRAWINGS

The accompanying drawings, which are incorporated in and constitute a part of this specification, illustrate example embodiments together with the general description given above, and the detailed description given below.

Figure 1:
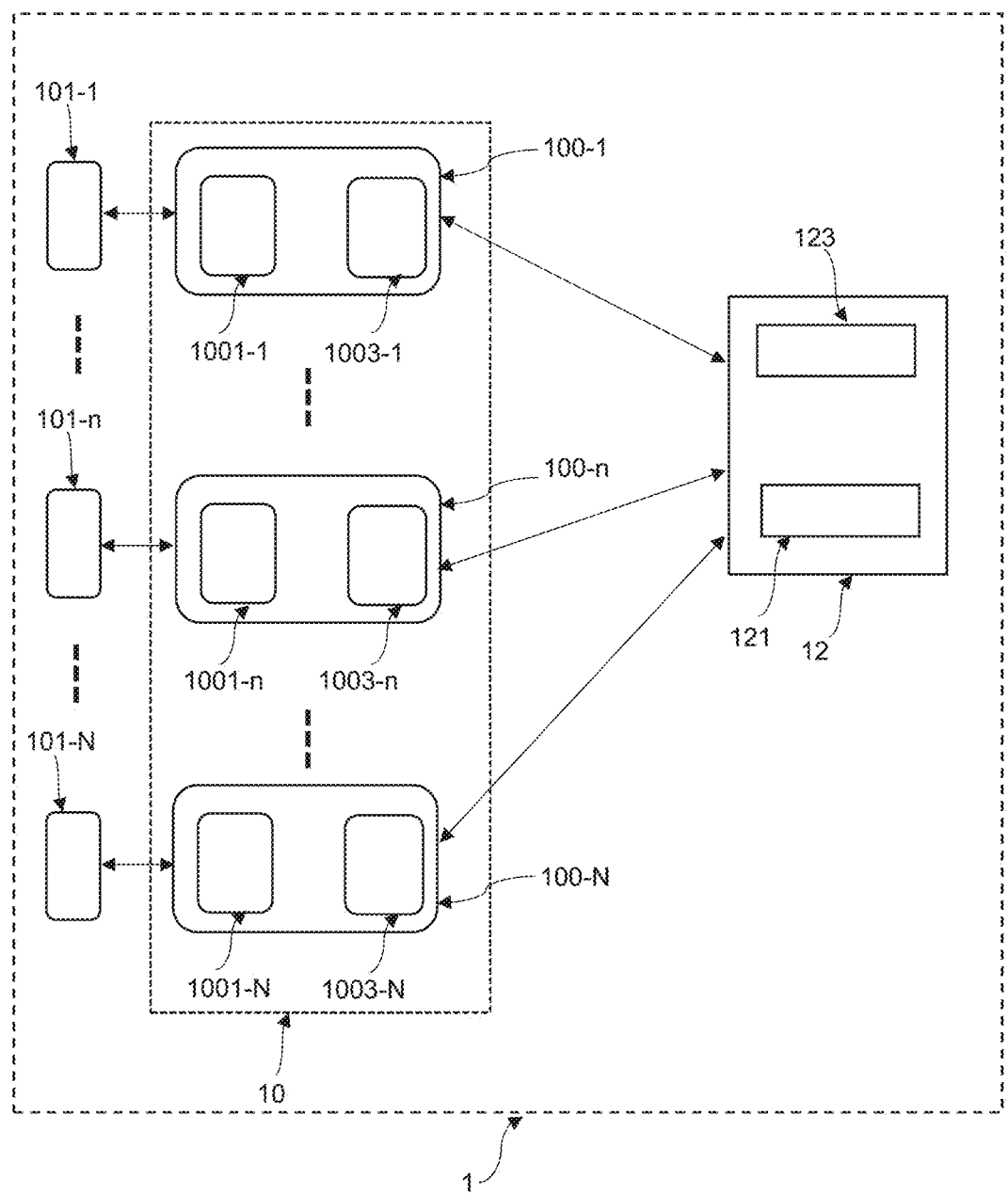
FIG. 1 is a schematic diagram illustrating an exemplary system in which exemplary embodiments may be implemented.

It should be noted that these drawings are intended to illustrate the general characteristics of devices, methods, and structures utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures, and techniques may be shown without unnecessary detail in order to avoid obscuring example embodiments.

Exemplary embodiments provide apparatuses, methods, and computer program products for collaborative learning.

Collaborative learning according to the various embodiments is defined according to a service-oriented approach described as an interaction between at least one collaborative learning service consumer (also referred to as a 'collaborative learning apparatus' or an 'apparatus' or "edge apparatus") and a collaborative learning server (also referred to as a 'server').

The collaborative learning apparatus implements a machine learning model configured with a set of model parameters generated locally at or for the collaborative learning apparatus based on the training of the machine learning model using training data that is available locally at or for the collaborative learning apparatus. The at least one collaborative learning apparatus benefits from the collaborative learning service from the server in order to update its local set of model parameters.

The at least one collaborative learning apparatus and the server implement the same machine learning model. Each collaborative learning apparatus configures, locally, the implemented machine learning model with its local set of model parameters.

The terms "local" or "locally" are used herein to designate features or data or parameters that correspond to or are associated with one collaborative learning apparatus. The term "local" or "locally" may also be used herein to designate operations performed by or under control of a collaborative learning apparatus. This allows to distinguish these operations from those performed by the server in a central manner. For example, local data refer to data that is available at or for one collaborative learning apparatus. A local set of model parameters refers to a set of model parameters that is generated in correspondence with one collaborative learning apparatus from data that is local to the collaborative learning apparatus. For example, a locally trained machine learning model refers to a machine learning model trained by and/or under control of the collaborative learning apparatus.

Collaborative learning aims at enhancing the local sets of model parameters used locally by each collaborative learning by taking advantage of the learning/training and knowledge acquired by the other collaborative learning apparatuses. The different collaborative apparatuses collaborate to continuously update their local sets of model parameters without having to share their training data.

The server plays the role of the coordinator/orchestrator of the update of the different local sets of model parameters. The server performs a centralized processing to generate common updated model parameters for the collaborative learning apparatuses requesting the collaborative learning service for the same machine learning use-case.

The server receives from each collaborative learning apparatus its local set of model parameters. Then, based on the set(s) of model parameter(s) received from the collaborative learning apparatus(es), the server decides whether, or not, to perform an update of the set of model parameters for the machine learning model, and, when to send the updated set of model parameters to at least one collaborative learning apparatus. In other words, each collaborative learning apparatus holds a local version of the set of model parameters generated and used locally to configure the machine learning model implemented locally and the server holds a master version of the set of model parameters that it may share with one or more collaborative learning apparatus(es) depending on one or more criteria. The master version is an updated set of model parameters which is an update of the set(s) of model parameters received from at least one collaborative learning apparatus. The server generates the master version based on the different versions received from the collaborative learning apparatus(es).

The interaction between the collaborative learning apparatus(es) and the server may use a request or a subscription model and service-based interfaces.

A machine learning model according to this specification may be any type of machine learning model, either supervised or unsupervised. The local sets of model parameters used locally at the different collaborative learning apparatuses to configure the machine learning model are enhanced through the collaborative learning orchestrated by the server.

Exemplary supervised machine learning models comprise without limitation support-vector machines (SVM), linear regression models, logistic regression models, Naïve Bayes models, linear discriminant analysis, decision trees, K-nearest neighbor algorithms, supervised artificial neural networks, and similarity learning models.

Exemplary artificial neural networks comprise without limitation autoencoders, recurrent neural networks and convolutional neural networks.

Exemplary unsupervised machine learning models comprise without limitation clustering models (e.g., hierarchical clustering, k-means, mixture models) and unsupervised artificial neural networks (e.g., deep belief networks, generative adversarial networks).

According to some embodiments in which the machine learning model is a neural network involving a plurality of layers, the set of model parameters may comprise one or more parameters including: the number of the model layers, weighting coefficients associated with the connections between the different layers, bias vectors, parameters of a loss function, etc.

According to some embodiments in which the machine learning model is a support vector machine algorithm, the set of model parameters comprises at least support vectors.

The machine learning model is implemented in a collaborative learning apparatus that may be used in a wide variety of applications and data-driven use-cases in different systems and various industries.

Exemplary applications comprise without limitation:
voice recognition;
image processing/computer vision;
natural language processing;
information retrieval;
personalization and recommendation;
robotics, and
data analytics including predictive and prescriptive analytics.

Exemplary systems comprise without limitation:
monitoring systems;
navigation systems;
surveillance systems;
transportation systems;
telecommunication systems.

Exemplary industries comprise without limitation:
the health sector: data from various hospitals can be collaborated in order to facilitate faster diagnosis, especially for rare diseases, or contagious diseases, where the number of samples available individually at clinics/hospitals may be reduced;
industrial Internet of Things or IoT: for example, if multiple autonomous vendors collaborate their learnings it may help coming up with better business management and planning decisions;
low enforcement: for example, if multiple surveillance cameras collaborate their learnings with face recognition, law enforcement agencies may be able to find missing people from densely populated areas;
traffic monitoring: for example, IoT devices monitoring the queue lengths may collaborate the learnings to facilitate faster movement of traffic by dynamically scheduling traffic signals.

In exemplary applications in telecommunication systems, the collaborative learning apparatus may be any end device or network entity implementing the machine learning model for various data-based use-cases for the design and/or planning and/or optimization of the telecommunication systems.

Exemplary use-cases comprise without limitation:

use-cases related to the physical-layer of communication networks such as modulation, coding, decoding, signal detection, channel estimation, prediction, compression, interference mitigation;

use-cases related to the medium access control layer of communication networks such as multiple access and resource allocation (e.g., power control, scheduling, spectrum management);

channel modeling;

network optimization;

cell capacity estimation in cellular networks;

routing;

resource management;

data traffic management;

security and anomaly detection;

root cause analysis;

transport protocol design and optimization;

user/network/application behavior analysis/prediction;

transport-layer congestion control;

user experience modeling and optimization;

user mobility and positioning management;

network slicing, network virtualization and software defined networking;

non-linear impairments compensation in optical networks (e.g., visible-light communications, fiber-optics communications, and fiber-wireless converged networks), and quality-of-transmission estimation and optical performance monitoring in optical networks.

Exemplary end devices comprise without limitation laptops, mobile phones, robots, drones, wearable devices, autonomous systems (e.g., autonomous vehicles in intelligent transport systems), Internet of Things (IoT) devices (e.g., connected vehicles, intelligent cameras, machines, and home alliances).

Exemplary network entities comprise without limitation:
radio access network entities such as base stations (e.g., cellular base stations like eNodeB in LTE and LTE-advanced networks and gNodeB used in 5G networks, and femtocells used at homes or at business centers);

relay stations;

control stations (e.g., radio network controllers, base station controllers, network switching sub-systems);

access points in local area networks or ad-hoc networks;

gateways and radio access network entities;

network management entities (e.g., Operation, Administration and Management (OAM) entity)

network automation systems;

distributed self-autonomous systems (D-SONs);

network functions (e.g., network data analytics function or NWDAF defined in current 3GPP standards).

FIG. 1 is a schematic diagram illustrating an exemplary system in which exemplary embodiments may be implemented.

The system 1 may be a digital system part of a communication system, a data processing system, or a data storage system. Exemplary digital systems comprise, without limitations:

radio communication systems, wireless communication systems, optical fiber-based communication systems, optical wireless communication systems, and satellite communication systems, and storage systems (e.g., cloud computing systems).

In application to wireless networks, the system 1 may be any wireless network involving any type of wireless propagation medium suitable for this type of connectivity. Exemplary wireless communication networks comprise, without limitation, ad-hoc wireless networks used in local area communications, wireless sensor networks, and radio communication networks (e.g., Long Term Evolution or LTE, LTE-advanced, 3G/4G/5G and beyond).

Exemplary applications to wireless networks comprise:
Machine-To-Machine (M2M);
Device-To-Device (D2D);
Industry 4.0;
IoT (for example vehicle-to-everything communications) involving networks of physical devices, machines, vehicles, home alliances and many other objects connected to each other and provided with a connectivity to the Internet and the ability to collect and exchange data without requiring human-to-human or human-to-computer interactions.

In exemplary IoT applications, the system 1 may be a wireless IoT network representing low energy power-consumption/long battery life/low-latency/low hardware and operating cost/high connection density constraints such as low-power wide area networks and low-power short-range IoT networks. The communication system 1 may be any wireless network enabling IoT in licensed or license-free spectrum.

Exemplary applications of M2M and IoT applications comprise, without limitation:
consumer applications (e.g., Internet of Vehicles, home automation, smart cities, wearable technologies, and connected health), and commercial applications (e.g., digitalized healthcare connecting medical resources and healthcare services in which special monitors and sensors may be used to enable remote health monitoring and emergency notifications, smart traffic control, and road assistance).

In another application to optical fiber networks, the system 1 may be any data network in which any optical fiber link is designed to carry data over short or long distances. Exemplary applications using optical fiber links over short distances comprise high-capacity networks such as data center interconnections. Exemplary applications using optical fiber links over long distances comprise terrestrial and transoceanic transmissions. In such applications, network data generated by the network elements operable in the system 1 may be carried by optical signals polarized according to the different polarization states of the optical fiber. The optical signals propagate along the fiber-based link according to one or more propagation modes.

Exemplary applications of optical fiber data networks comprise, without limitation, aerospace and avionics, data storage (e.g., in cloud computing systems, automotive, industry, and transportation). Such applications may involve transfer of voice (e.g., in telephony), data (e.g., data supply to homes and offices known as fiber to the home), images or video (e.g., transfer of internet traffic), or connection of networks (e.g., connection of switches or routers and data center connectivity in high-speed local area networks).

The system 1 comprises a server 12 and at least one collaborative learning apparatus 100-$n$ with n=1, . . . , N and N designating a total number of the collaborative learning apparatuses. The server 12 provides collaborative learning services to at least one collaborative learning apparatus 100-$n$.

In the system 1:
the server 12 communicates with the at least one collaborative learning apparatus 100-$n$ for the operations related to the collaborative learning services, and each collaborative learning apparatus 100-$n$ communicates with or includes at least one data source 101-$n$ for operations related to collecting data for training and/or inference generation purposes.

The interactions involving the server and the collaborative learning apparatus 100-$n$, with n=1, . . . , N, may use a request or subscription model and service-based interfaces.

In application to 5G and beyond networks, discovery and selection procedures may be performed before establishing any communication link between the entities operable in the system 1. For example, the collaborative learning apparatus 100-$n$ may perform discovery and selection procedures to select the server 12 that supports the requested collaborative learning service.

Discovery and selection procedures may be performed using the methods defined in 3GPP standards and are not detailed in the present disclosure. In the following description, the server 12 corresponds to the collaborative learning server selected by the collaborative learning apparatus 100-$n$ for n=1, . . . , N during the discovery and selection phase. The discovery and selection procedures may comprise authentication steps for example to authenticate the collaborative learning apparatus 100-$n$.

The data source 101-$n$, with n=1, . . . , N, generates data for training and/or for generating inferences by running the machine learning model implemented at the collaborative learning apparatus 100-$n$.

In application to communication systems, exemplary data collected by a data source may comprise, without limitation:
measurements data;
alarm data;
configuration data (e.g. data identifying the hardware and/or software configuration of an entity operable in a communication network), and
network description data (e.g., network topology data, network configuration data, network activity data).

Exemplary measurements data comprise, without limitation:
network measurements data such as channel state measurements and quality of service measurements;
fault measurements data;
performance measurements data or Key Performance Indicators (KPIs) such as downlink and/or uplink throughput, signal-to-noise ratio, bit rates, and round trip time;
platform computing measurements data;
security-related measurements data, and
communication measurements data such as traffic measurements data and network capacity measurements data.

Data used as input data to train the machine learning model (during a training phase) is designated as training data or training samples. For example, when the machine learning model implements a segmentation algorithm applied to images, the training data may include input images to be segmented and associated labels for implementing a supervised training.

Data used as input data to generate inference data (that may be used as 'data insights' or to generate 'analytics data') by running the trained machine learning model (during an 'inference phase' also referred to as an 'operational phase') is designated as operational input data (also referred to as 'input data'). The inference data are output data of the trained machine learning model. For example, when the machine learning model implements a segmentation algorithm applied to images, the inference data may include segmented image(s) and/or associated label(s) and/or segmentation mask(s).

One or more operations may be performed on the training and/or input data to clean-up the data and/or making it stationary for example. Exemplary operations comprise, without limitation, pre-processing operations, feature extraction operations, etc.

In some embodiments in application to wireless communication systems, the collaborative learning apparatus 100-$n$ is an edge apparatus operable at a wireless edge 10 in the system 1.

Referring to FIG. 1, the collaborative learning apparatus 100-$n$ comprises processing means 1003-$n$ and storage means 1001-$n$, for n=1, . . . , N. The processing means 1003-$n$ are configured to obtain a set of model parameters of a machine learning model, for example by performing operations related with the generation and/or update of the local set of model parameters used at the collaborative learning apparatus 100-$n$. The processing means 1003-$n$ are configured to configure the machine learning model with the obtained parameters. The storage means 1001-$n$ are configured to store input operational data collected from the data source 100-$n$.

The set of model parameters local to the collaborative learning apparatus 100-$n$ results from the training of the machine learning model during a training phase using training samples.

According to some embodiments, the training of the machine learning model implemented at the collaborative learning apparatus 100-$n$ may be performed by the processing means 1003-$n$. In these embodiments, the storage means 1001-$n$ are configured to store the training samples comprising the training samples received from the data source 101-$n$ and/or training samples generated locally at the collaborative learning apparatus 100-$n$ (e.g. simulation-based training samples).

According to other embodiments (not illustrated in FIG. 1), the training of the machine learning model implemented at the collaborative learning apparatus 100-$n$ is performed by a training device (not illustrated in FIG. 1). The training device may be configured to collect training data from one or more data sources 110-$n$ and to generate one or more sets of model parameters for configuring the machine learning model implemented at one or more collaborative learning apparatus(es) 100-$n$, for n=1, . . . , N. This means that the training device may perform training operations for one or more collaborative learning apparatuses 100-$n$.

When the training of the machine learning model ends or after a training period fulfilling a given criteria, the collaborative learning apparatus 100-$n$ configures the implemented machine learning model with the set of model parameters obtained by the training process. The collaborative learning apparatus 100-$n$ runs the trained learning-based model configured with the set of model parameters to generate inference data using input data collected from the data source 101-$n$. The processing means 1003-$n$ may be configured to generate analytics data from the inference data.

Data analytics may designate various processes for analyzing input data to extract and/or predict and/or or estimate metrics and/or patterns in input data. Data analytics may include: descriptive analytics that evaluate variations or changes over a given period of time, diagnostic analytics that investigates the cause of change, predictive analytics that forecasts what could be happen in near time, prescriptive analytics that suggests a set of actions and measures, etc. The wording "analytics data" used here designed output data of a data analytics process.

Referring to FIG. 1, the server 12 comprises processing means 123 and storage means 121. The processing means 123 are configured to perform the operations related with the update of the set of model parameters received from the at least one collaborative learning apparatus 100-n. The storage means 121 are configured to store the inputs received from the at least one collaborative apparatus 100-n.

Figure 2:
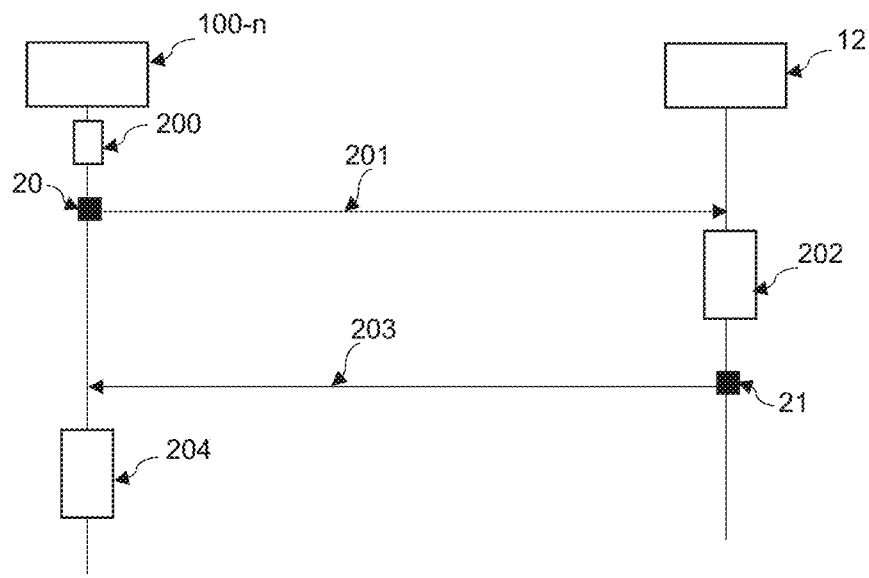
FIG. 2 is a connection flow diagram illustrating an exemplary implementation of collaborative learning, according to some embodiments.

FIG. 2 is a connection flow diagram illustrating an exemplary implementation of the collaborative learning service, according to some embodiments. More specifically, FIG. 2 illustrates a collaborative learning service requested by at least one collaborative learning apparatus 100-n to update a current set of model parameters resulting from the training of the machine learning model implemented at the collaborative learning apparatus 100-n. This means that the trained machine learning model is configured at the collaborative learning apparatus 100-n with the current set of model parameters and the collaborative learning apparatus 100-n requests from the server 12 an update of the current set of model parameters.

FIG. 2 illustrates the collaborative learning service for updating a current set of model parameters corresponding to one current request for the collaborative learning service. The collaborative learning service may be triggered by the collaborative learning apparatus 100-n periodically at periodic time instants or depending on the accuracy of the machine learning model configured with the current set of model parameters. The current set of model parameters corresponds thus to the set of model parameters that is used at the collaborative learning apparatus 100-n at a given current time instant at which the collaborative learning apparatus triggers the collaborative learning service from the server 12. The steps 200 to 204 may be accordingly repeated at each time one collaborative learning apparatus 100-n triggers a collaborative learning service from the server 12.

In FIG. 2 only one collaborative learning apparatus 100-n is illustrated for simplification reasons. However, the collaborative learning applies to embodiments involving two or more collaborative learning apparatuses 100-n, with n=1, . . . , N and N higher than or equal to two. Moreover, the processing means 1003-n and 123 are not illustrated for simplification reasons. The operations illustrated in FIG. 2 performed at the server side (respectively the collaborative learning apparatus 100-n) are performed by the processing processing means 123 (respectively the processing means 1003-n).

The processing means 1003-n determine at step 200 the time instant 20 for triggering the request of a collaborative learning service from the server 12, i.e., to request an updated set of model parameters that is an update of the current set of model parameters.

In some embodiments, the processing means 1003-n are configured to determine the time instant 20 based on one or more of an accuracy value and a model update timer. The accuracy value represents the accuracy of the trained machine learning model configured at the collaborative learning apparatus 100-n with the current set of model parameters.

In some embodiments in which the processing means 1003-n perform the training of the machine learning model, the processing means 1003-n are configured to generate the accuracy value.

In other embodiments in which the training of the machine learning model is performed by a training device that is external to the collaborative learning apparatus 100-n, the processing means 1003-n obtain from the training device the accuracy value that has been generated by the training device.

At step 201, the processing means 1003-n send the current set of model parameters to the server 12.

According to some embodiments, the processing means 1003-n are configured to send, in addition to the current set of model parameters, at least one of, the accuracy value, the number of training samples that have been used to train the machine learning model, analytics data, one or more formats of input data, a feature extraction algorithm, and one or more data pre-processing techniques. The analytics data are previously obtained from inference data generated by the processing means 1003-n by running the trained machine learning model configured with the current set of model parameters using input data collected from the data source 101-n.

The server 12 receives the current set of model parameters sent by the collaborative learning apparatus 100-n. More generally, the server 123 receives the current set of model parameters sent by each collaborative learning apparatus 100-n, with n=1, . . . , N requesting the collaborative learning service from the server 12.

The processing means 123 generate, at step 202, at least one updated set of model parameters based on the at least one current set of model parameters received from the at least one collaborative learning apparatus 100-n.

The processing means 123 send, at step 203, the generated at least one updated set of model parameters to the at least one collaborative learning apparatus 100-n.

According to some embodiments in which two or more collaborative learning apparatuses 100-n request the collaborative learning service from the server 12, the processing means 123 are configured to generate the updated set of model parameters by performing a centralized processing based on two or more current sets of model parameters received from the two or more collaborative learning apparatuses 100-n and 100-m with n and m varying between 1 and N and being different.

In an exemplary embodiment, the centralized processing comprises federated averaging according to which the processing means 123 are configured to generate the updated set of model parameters by applying a weighted average to the two or more current sets of model parameters using two or more weighting coefficients to fit a Gaussian model.

In some embodiments, the processing means 123 are configured to generate the weighting coefficient applied to one set of current model parameters received from one collaborative learning apparatus 100-n based on one or more of:

the accuracy value sent by the collaborative learning apparatus 100-n and representing the accuracy of the trained machine learning model configured with the corresponding current set of model parameters, and the number of training samples that has been used to train the machine learning model for the collaborative learning apparatus 100-n and that has been received from the collaborative learning apparatus 100-n.

According to some embodiments, the centralized processing comprises mean square errors function.

According to some embodiments in which the machine learning model is a neural network, federated averaging may be applied to biases and/or weighting coefficients (i.e. synaptic weights) associated with the connections between the different layers of the neural network and/or the activation functions. The updated set of model parameters may be generated by applying a weighted average to these weighting coefficients and/or biases. In such a case, the various ML models trained by two or more collaborative learning apparatuses 100-$n$ and 100-$m$ are identical (e.g. same number of layers, same connections between layers, same activation functions) and a weighted average can be applied parameter by parameter for at least some parameters of the neural network. For example, a value of a given synaptic weight (respectively bias) in the updated set of parameters is computed as a weighted average of the values of the same synaptic weight (respectively bias) of the set of parameters received from the collaborative learning apparatuses 100-$n$ and 100-$m$.

According to some embodiments, the processing means 123 are configured, at step 202, to perform a test accuracy to test the accuracy of the machine learning model configured with the at least one updated set of model parameters. The processing means 123 generate at least one updated accuracy value such that one updated accuracy value represents the accuracy of the machine learning model configured with one updated set of model parameters.

According to some embodiments, the processing means 123 are configured to determine, at step 202, a time 21 for sending the at least one updated set of model parameters to at least one collaborative learning apparatus 100-$n$ based on one or more of the at least one updated accuracy value, the number of the at least one current set of model parameters that have been received by the server 12, and a model update timer.

For example, the processing means 123 may delay the generation and/or the transmission of the updated set of model parameters if the number of propositions, i.e., the number of the current sets of model parameters that have been received by the server is lower than a threshold.

In another example, the processing means 123 may schedule sending the updated set of model parameters periodically based on the model update timer.

Still in another example, the processing means 123 may determine the time 21 based on the accuracy value with respect to an accuracy threshold value.

The accuracy threshold value may be defined based on quality-of-service requirements.

In some embodiments in which the server receives two or more current sets of model parameters from two or more collaborative learning apparatuses 100-$n$, 100-$m$, the processing means 123 are configured to group the two or more collaborative learning apparatuses 100-$n$, 100-$m$ into one or more clusters of collaborative learning apparatuses. In these embodiments, the processing means 123 may be configured to generate at least one updated set of model parameters per cluster of collaborative learning apparatuses.

The collaborative learning apparatus 100-$n$ receives at step 203 an updated set of model parameters from the server 12 and configures, at step 204, the trained machine learning model with the updated set of model parameters by replacing the current set of model parameters with the received updated set of model parameters.

According to some embodiments, the server 12 provides the collaborative learning service to at least one collaborative learning apparatus 100-$n$ using a machine learning use-case based subscription mechanism, a Kafka topics-based subscription mechanism, or sidecars.

In an embodiment using machine learning use-case based subscription mechanisms, a collaborative learning apparatus 100-$n$ requesting a collaborative learning service for a specific machine learning use-case sends a subscription request to the server 12 to receive at least one updated set of model parameters for the machine learning use-case.

In some embodiments, the subscription request comprises an identifier of a use-case specific classification algorithm.

Figure 3:
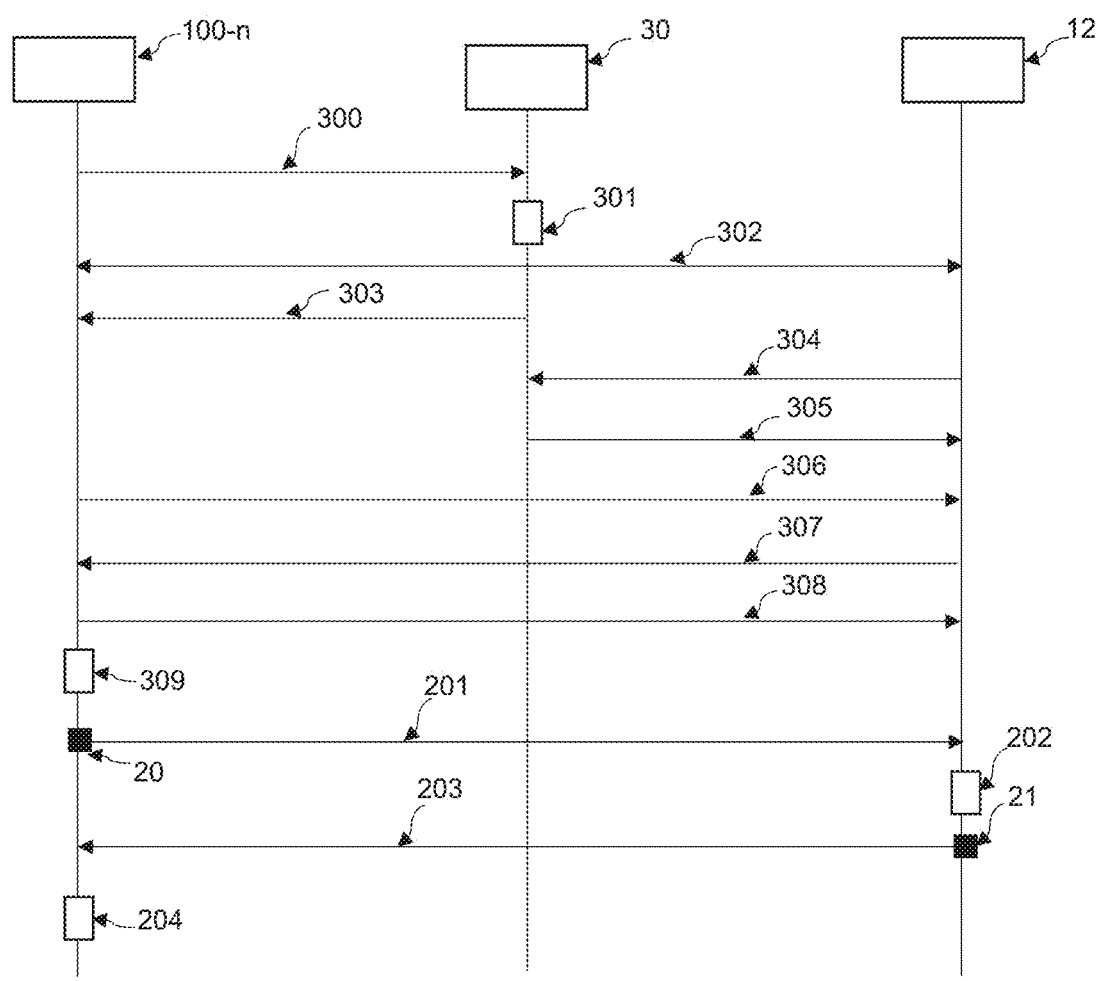
FIG. 3 is a connection flow diagram illustrating an exemplary implementation of collaborative learning, according to some embodiments.

FIG. 3 is a connection flow diagram illustrating an exemplary implementation of the collaborative learning service, according to some embodiments. More specifically, FIG. 3 illustrates subscription-based collaborative learning triggered by at least one collaborative learning apparatus 100-$n$ from the server 12 and involving a collaborative learning facilitator apparatus 30.

Similarly, to FIG. 2, only one collaborative learning apparatus 100-$n$ is illustrated in FIG. 3 for simplification reasons. Also, as in FIG. 2, the processing means 1003-$n$ and 123 are not depicted in FIG. 3 for simplification reasons. The steps performed at the side of the collaborative apparatus 100-$n$ may be performed by the processing means 1003-$n$ and those performed at the side of server 12 may be performed by the processing means 123.

At step 300, the processing means 1003-$n$ send a subscription request to the collaborative learning facilitator apparatus 30 to request a subscription to the collaborative learning service for a specific use-case.

In some embodiments, the subscription request comprises an identifier of the use-case specific classification algorithm.

In some embodiments in application to wireless communication systems, the use-case may a use-case related to radio access network optimization or to privacy-based public safety.

The role of the collaborative learning facilitator apparatus 30 is to facilitate the subscription of the collaborative learning apparatus 100-$n$ to specific use-cases. It ensures that only authenticated and authorized apparatuses can subscribe and use collaborative learning.

The collaborative learning facilitator apparatus 30 may be implemented as a physical part of the server 12 or in a separate entity.

Thus, at step 301, the collaborative learning facilitator apparatus 30 checks if the collaborative learning apparatus 100-$n$ is authenticated and authorized for the collaborative learning service for the specific use-case. Then, at step 302, the collaborative learning facilitator 30 establishes a communication between the collaborative learning apparatus 100-$n$ and the server 12 and confirms at step 303 the subscription to the collaborative learning apparatus 100-$n$.

At step 304, the processing means 123 send a request to the collaborative learning facilitator apparatus 30 to receive use-case specific configuration parameters. These parameters may include one or more of a periodicity of model parameters exchange between the collaborative learning apparatus 100-$n$ and the server 12, acceptance levels of false inferences, the selected machine learning model.

The collaborative learning facilitator apparatus 30 sends at step 305 the requested use-case specific configuration parameters to the server 12.

The collaborative learning apparatus 100-$n$ sends, at step 306, a request for an initial set of model parameters, to the server 12. In response to this request, the server 12 sends at step 308 an initial set of model parameters to the collaborative learning apparatus 100-$n$. The server 12 may obtain the initial set of model parameters from existing machine learning models that are used by other collaborative learning apparatuses 100-$m$ or may have existing machine learning models that have been previously trained with training data available at the server 12 and having accepted test accuracies.

The collaborative learning apparatus 100-$n$ subscribing to the specific use-case can further participate in collaborative learning and enhance the existing model parameters with its local learning. Also, even if the collaborative learning apparatus 100-$n$ has not learnt for the specific use-case, it gets from the server 12 a ready-made machine learning model which can be used as soon as the collaborative learning apparatus 100-$n$ plugs in. The server 12 provides, in addition to the initial set of model parameters, one or more of the data formats to be used (e.g., images with meta-data represented in XML or YAML formats, objection detection information formats), pre-processing techniques to make data more adapted to the machine learning model, and feature extraction algorithms used commonly for all collaborative learning apparatuses subscribed to the same use-case.

At step 309, the processing means 1003-$n$ configure the machine learning model with the initial set of model parameters received from the server 12. The processing means 1003-$n$ enhance the initial set of model parameters through the training (locally or by a training device external to the apparatus 100-$n$, the training device being operated under control of the apparatus 100-$n$) of the machine learning model. A current set of model parameters is obtained by the training of the machine learning model. The processing means 1003-$n$ determine, at step 309, the time instant 20 for triggering the request of a collaborative learning service from the server 12 to get an update of the current set of model parameters. The steps 20, 21 and 201 to 204 are performed to update the current set of model parameters as described with reference to FIG. 2.

Figure 4:
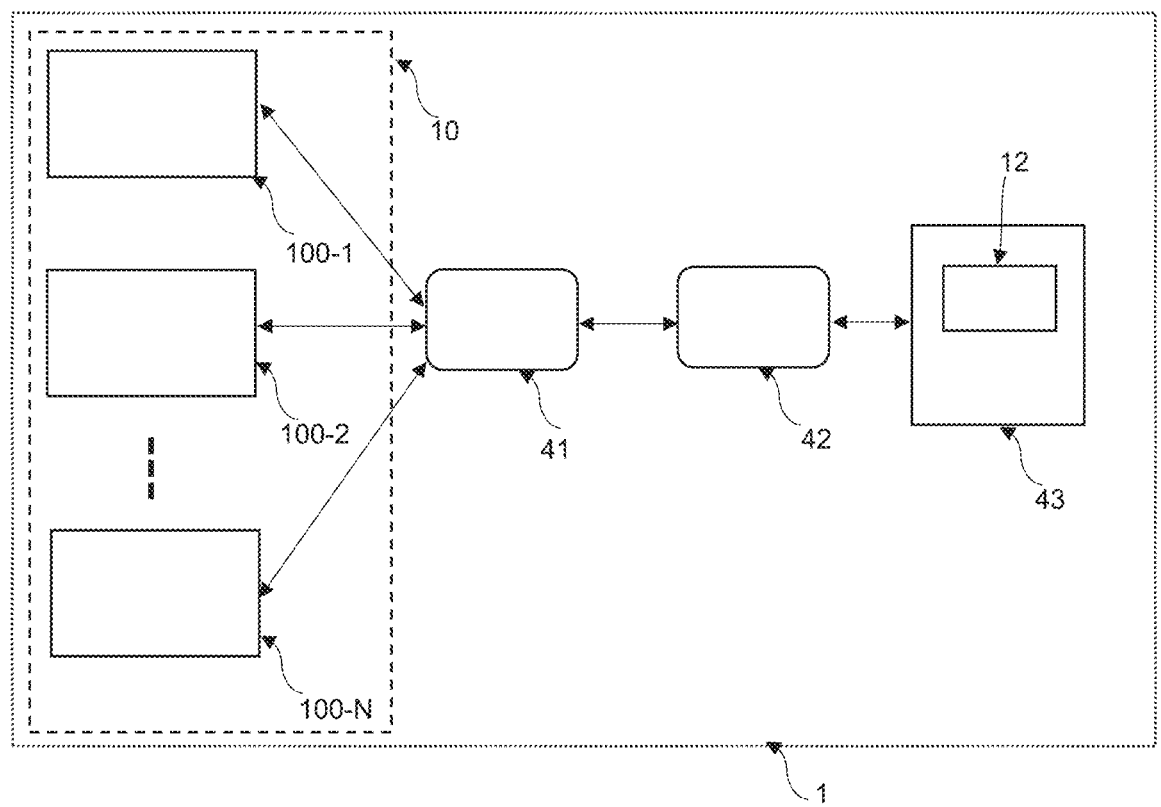
FIG. 4 is a schematic block diagram illustrating an exemplary implementation of collaborative learning in a wireless communication system, according to some embodiments.

FIG. 4 is a schematic diagram illustrating an exemplary implementation of collaborative learning in a radio communication system 1, according to some embodiments for radio access network optimization at the wireless edge 10 in the radio communication system 1. In this implementation, the collaborative learning apparatuses 100-1 to 100-N are D-SON/near-real-time radio access network Intelligent Controllers and the server 12 is hosted in a centralized cloud 43 where one or more management data analytics functions may be deployed. Further, the radio communication system involves a network management system 41 and a centralized self-organizing network (C-SON) 42.

FIG. 4 shows a logical implementation flow diagram, however, physically, the D-SON entities 100-1 to 100-N would be closer to the cells in the radio communication system 1 and the centralized cloud 43 would be far from the wireless edge 1.

With limited computational capabilities at the wireless edge 10 and limited data visibility, radio access network optimization decisions made at one D-SON entity 100-$n$ may conflict with decisions made by other D-SON entities 100-$m$. With collaborative learning, multiple D-SON entities 100-$n$ can share their learnings by sharing their local sets of model parameters with the server 12. Collaborative learning performed at the centralized cloud may aggregate multiple sets of model parameters received from various D-SON entities subscribed for the same use-case.

The server 12 receives the sets of model parameters from the D-SON entities 100-$n$ collaborating for the collaborative learning service.

The D-SON entities 100-1 to 100-N perform mobility robustness optimization (MRO) operations and mobility load balancing (MLB) operations and collaborate their learnings in order to ensure most optimum time to trigger (TTT) and cell individual offsets (CIOs). Each D-SON entity 100-$n$ implements an MRO module (not illustrated in FIG. 4) to perform the MRO operations and an MLB module (not illustrated in FIG. 4) to perform the MLB operations.

The MRO and MLB modules make decisions to modify TTT and CIO parameters of different cells in the radio communication system 1. These parameters define the time to trigger handovers and coverage area for the cells involved in the optimizations.

The D-SON entities 100-1 to 100-N implement local machine learning model trained with local data for MRO and MLB optimizations. In this example, training data may comprise performance measurements and KPIs related to radio resource utilization, latencies, traffic volume, active users, late/early/wrong handovers, and ping-pong handovers.

The D-SON entities 100-1 to 100-N send their local inferences comprising the TTT and CIO changes decided locally to the server 12 which evaluates and enhances them.

A same set of performance measurements and KPIs is also available at the C-SON 42 and the centralized cloud 43, but, possibly with a different granularity. A performance measurements counter collection interval at the D-SON entities 100-1 to 100-N may be smaller than that at the C-SON 42.

The server 12 may consume the same set of performance measurements and KPIs, but with a broader system level view. The server 12 uses the set of performance measurements and KPIs for training the machine learning model. The server 12 receives in addition cell-specific parameters providing cell-specific configuration details.

The server 12 groups the cells involved in the collaborative learning into clusters based on the cell-specific parameters in a manner that similar cell configurations can have common machine learning models.

When a new cell gets plugged in, once the appropriate cluster is identified, initial model parameters can be provided accordingly by the server 12.

Federated averaging may be performed independently for each cluster such that the server 12 sends an updated set of model parameters to the D-SON entities 100-$n$ according to the clusters.

The machine learning models implemented at the server 12 are trained to detect and predict conflicting or sub-optimal inference data made by the D-SON entities that belong to the corresponding cluster.

The result of collaborating the learnings from the different D-SON entities 100-1 to 100-N can lead to much improved machine learning models at the D-SON entities 100-1 to 100-N in addition to better network performance.

Performing collaborative learning enables continuously improving the model parameters and improving the decisions made by the D-SON entities 100-$n$ at the wireless edge 10.

Another exemplary radio access network optimization operation is the optimization of the capacity and the coverage of the radio communication system to decide dynamic antenna tilt adjustments. Different D-SON entities 100-$n$ may take independent decisions for antenna tilt adjustments, and conflicting decisions may end up increasing radio interference between neighboring cells. Optimization-specific collaborative learning may be used between the different D-SON entities 100-$n$ to allow more efficient and non-conflicting decision making despite limited computation resources at the wireless edge 10.

The server 12 may apply clustering techniques in the centralized cloud in order to group similar input and output combinations are requested by multiple D-SON entities 100-$n$. Clustering may be performed based on the use-cases to which the D-SON entities 100-$n$ have subscribed.

During subscription for a collaborative learning service, the D-SON entities 100-$n$ may specify the target optimization as use-case classifier. The local sets of model parameters are sent to the server 12 and one or more enhanced sets of model parameters are provided by the server 12 to the D-SON entities 100-*n* subscribed to the collaborative learning service.

In an exemplary application to 5G communication systems, the coordination between D-SON and C-SON using a management data analytics (MDA) functionality as defined in the 3GPP TS 28.313 standard specifications may be performed using the collaborative learning according to any embodiment detailed herewith. In order to integrate the collaborative learning to the 3GPP standards, requirements and analytics report updates may be introduced for SON conflict prevention and resolution and for collaborated SON optimizations.

For SON conflict analysis (e.g., detection of conflicting decisions between D-SONs) and in order to prevent and/or solve the detected conflicts, the following features may be introduced:

- the MDA management services (MnS) producer may allow any authorized MDA MnS consumer to subscribe to specific collaborative learning services of the MDA;
- the MDA MnS producer may allow any authorized MnS consumer to send information including at least one of: inference data of local machine learning model, data formats of input data processed by the local machine learning model; pre-processing techniques, and feature extraction algorithms, the information being generated by one or more analytics functions running at D-SON entities;
- the MDA MnS producer may allow any authorized MDA MnS consumer to receive updated machine learning model parameters for enhanced near-real-time optimizations to be performed at various D-SON entities.

The data used at the MDA for SON conflict analysis comprises for example:

- inference data (e.g., one or more decisions taken locally by a D-SON entity) from the D-SON entities: the inference data from various D-SON entities may be sent to the MDA via the C-SON, to be compared for conflict analysis and/or conflict detection and/or collaborative learning. The inference data may be received periodically at the MDA;
- data formats used by the D-SON entities subscribed to the collaborative learning services;
- pre-processing techniques used by the D-SON entities subscribed to the collaborative learning services;
- feature extraction algorithms used by the D-SON entities subscribed to the collaborative learning services. A selection from a list of supported algorithms may be performed;
- local analytics decisions from D-SON entities (i.e. the decisions made by local analytics functions running at the D-SON entities);
- a collaborative learning category: maps to the type of conflict (e.g., MLB and MRO or Capacity and coverage optimization);
- a cell group (depending on cell density in the area, cells can be grouped into dense-urban groups, dense-rural groups, sparse-rural groups, etc.)

The analytics report for SON conflict prevention and resolution comprises analytics results for updates required at the D-SON entities, i.e., analytics results for reducing conflicting decisions in near-real-time. Different D-SON entities may get different model parameter updates. The analytics report may be an array with size equal to the number of cell groups.

For SON optimizations, at least one of the following features may be introduced:

- the MDA MnS producer may allow any authorized MDA MnS consumer to subscribe to one or more specific collaborative learning services;
- the MDA MnS producer may allow any authorized MDA MnS consumer to send information concerning local inference data and/or data formats of input data applied to the machine learning model implemented at the MDA MnS consumer, preprocessing techniques and/or feature extraction algorithms; this information may be generated by one or more analytics functions running at the D-SON entities,
- the MDA MnS producer may allow any authorized MDA MnS consumer to receive updated machine learning model parameters for enhanced near-real-time optimizations to be performed at various D-SON entities.

Figure 5:
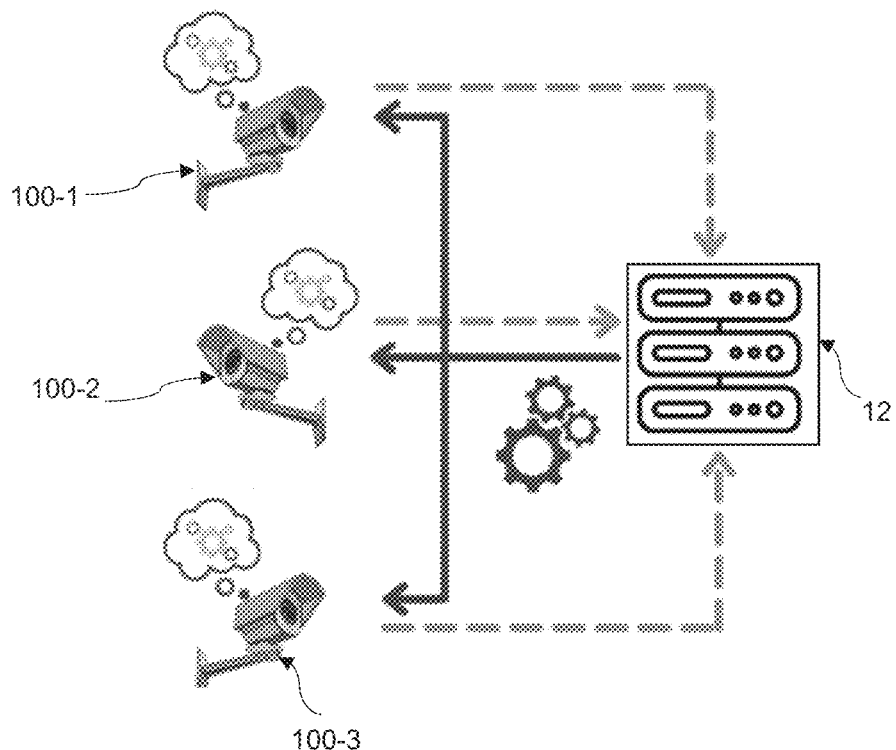
FIG. 5 is a schematic diagram illustrating an exemplary implementation of collaborative learning for public safety enhancement using CCTV cameras, according to some embodiments.

FIG. 5 is a schematic diagram illustrating an exemplary implementation of the collaborative learning for public safety enhancement using CCTV cameras.

CCTV cameras are commonly deployed for public safety and home security solutions. With wireless 5G technologies, CCTV cameras can be connected to the internet and enable various mobile application to use the provided captured information for effective automation. The CCTV cameras implement machine learning models for example, for face recognition-based door opening/closing applications and face recognition-based home safety. It is very important that the intelligence of the CCTV cameras be accurate and does not get mis-used by hackers. Also, it is importance that number of false-positives and false-negatives from such intelligence are negligeable or equal to zero.

The CCTV cameras have capabilities of detecting objects. However, specific object of interest may be decided using applications that can derive inferences from the objects detected by the cameras. For example, smart cameras are capable of detecting vehicles as well as human beings. However, applications maybe interested only in detecting humans and not vehicles.

In an application to transportation systems, for some law enforcement agencies, it may be important to read and detect the number plates of the vehicles captured in the surveillance cameras installed on traffic signals for example.

In another application, the CCTV cameras may be installed at home for face recognition.

Still in another application, the CCTV cameras may be installed at airports and railway stations to measure individual's temperatures to detect potential patients who may pose a threat to others.

In the exemplary implementation depicted in FIG. 5, three CCTV surveillance cameras 100-1 to 100-3 subscribe to collaborative learning service from the server 12. The server 12 may provide subscriptions to a variety of use-cases where different kinds of pre-processing techniques and feature-extraction algorithms are used.

The cameras that have subscribed to a common type of use-case can collaborate their learnings by sharing their local machine learning model parameters that allow them to detect objects (e.g., vehicles) with the server 12 (hosted in a centralized cloud).

The cameras also send their local inference data to the server 12 by sending detected objection information along with their local model parameters. The detected object information may be encoded prior to its transmission to the server 12.

The server 12 correlates the learnings from the cameras registered for the same kind of object detection (e.g., vehicle number plates, face recognition, temperature measurement of individuals). The server 12 sends the obtained enhanced model parameters to the cameras subscribed for the same use-case.

Collaborative learning according to various exemplary embodiments enables minimizing false decisions at the wireless edge, re-using of models, and continuously improving the models at the edge as well as at the centralized cloud.

Subscription-based use-case specific collaborative learning according to various embodiments enable entities at the wireless edge with a common use-case subscribing to the collaborative learning hosted at the centralized cloud.

Various exemplary embodiments provide a privacy preserving solution for data transfer between the edge apparatuses and the centralized cloud by transferring the model parameters instead of raw data.

Various exemplary embodiments enable preventing tampering with inference data transferred from the centralized cloud to the edge apparatuses by sharing enhanced model parameters from the centralized cloud and generating inference data by the edge apparatuses instead of the centralized cloud. More generally this reduces the traffic load between the edge apparatus and the server since the transmission of training data from edge apparatus to the server and/or the transmission of inference data from the server to the edge apparatus may be avoided. Further interception of the training data and/or inference data and their mis-used for malicious purposes can be avoided.

Various exemplary embodiments enable re-using enhanced models at the wireless edge for apparatuses having similar objectives. Even the apparatuses that do not have learning capabilities can subscribe to the collaborative learning services.

Various exemplary embodiments enable enhancing the accuracy of the machine learning models at the wireless edge.

Figure 6:
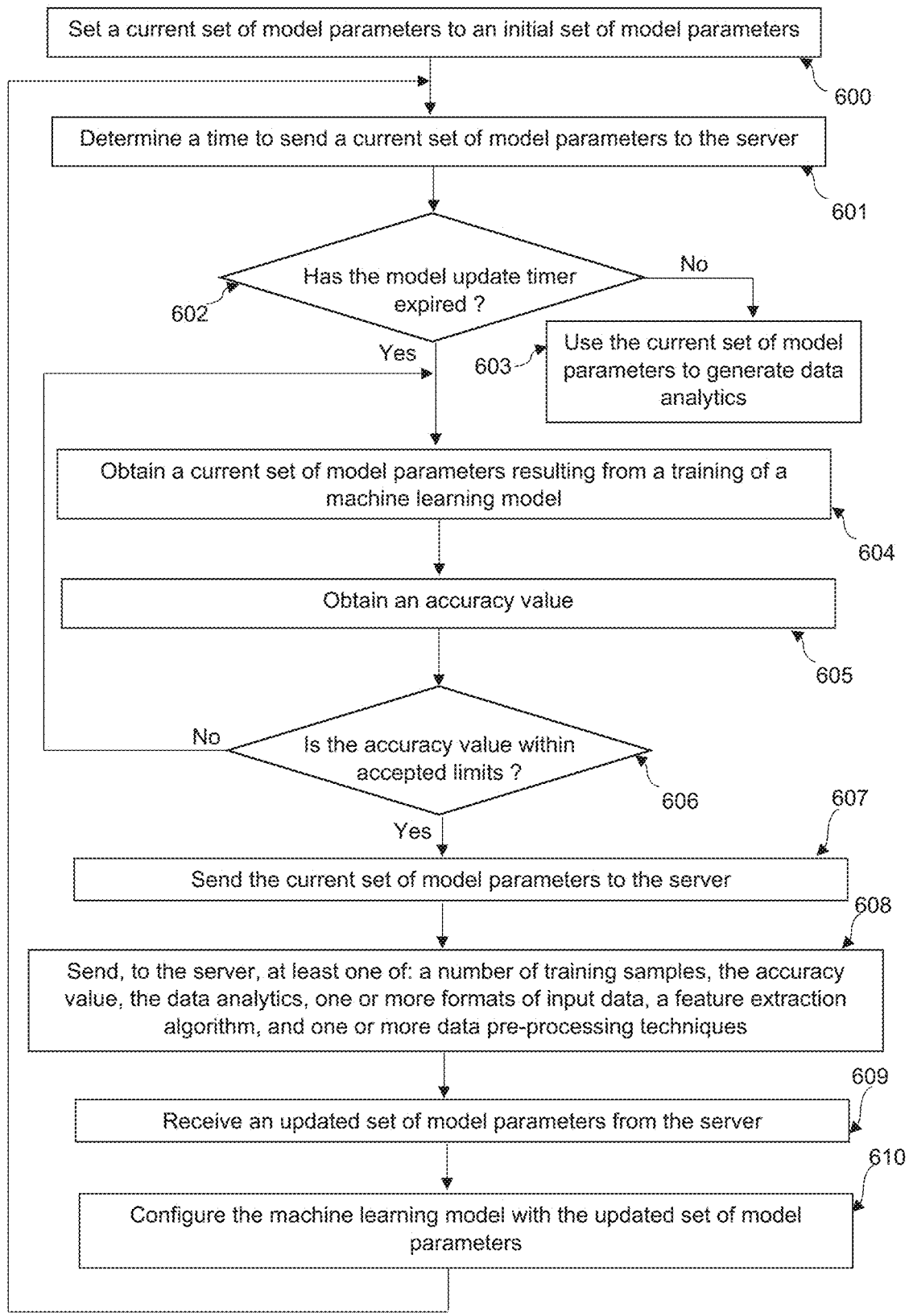
FIG. 6 is a flowchart depicting a method for use at a collaborative learning apparatus, according to some embodiments.

FIG. 6 is a flowchart depicting a method for use at a collaborative learning apparatus 100-*n*, according to some embodiments.

At step 600, an initialization step is performed to initialize the set of model parameters at the collaborative learning apparatus 100-*n* by setting a current set of model parameters to an initial set of model parameters.

The initial set of model parameters may be previously received from the server 12 upon request for example when the collaborative learning apparatus 100-*n* plugs in.

Step 600 may be preceded by a subscription step for subscribing to a specific use-case by sending a subscription request to the server 12.

Step 600 comprises configuring the machine learning model implemented at the collaborative learning apparatus with the current set of model parameters.

At step 601, a time to send the current set of model parameters to the server 12 is determined according to any preceding feature described with reference to FIG. 2 to FIG. 5.

At step 602, it is determined if a model update timer has expired.

If it is determined at step 602 that the model update timer has not expired, step 603 is performed to generate inference data by running the machine learning model configured with the current set of model parameters. Analytics data may be generated based on the inference data.

If it is determined at step 602 that the model update timer has expired, step 604 is performed to obtain a new current set of model parameters resulting from the training of the machine learning model implemented at the collaborative learning apparatus 100-*n*. The training may be performed by the collaborative learning apparatus 100-*n* or by an external training apparatus according to any embodiment described with reference to FIG. 2 to FIG. 5.

At step 605, an accuracy value representing the accuracy of the machine learning model configured with the current set of model parameters is obtained.

At step 606, it is determined if the accuracy value is within accepted limits (e.g., higher than a threshold).

If it is determined at step 606 that the accuracy value is not within the accepted limits, step 604 is performed to re-train the machine learning model and obtain a current set of model parameters having an accuracy value that belongs to the acceptable limits.

If it is determined at step 606 that the accuracy value is within the accepted limits, step 607 is performed to send the current set of model parameters to the server 12.

At step 608, at least one of, number of training samples, the accuracy value, the analytics data obtained at step 603, one or more formats of input data, a feature extraction algorithm, and one or more data pre-processing techniques, is sent to the server 12.

At step 609, an updated set of model parameters is received from the server 12.

At step 610, the machine learning model is configured with the updated set of model parameters.

Figure 7:
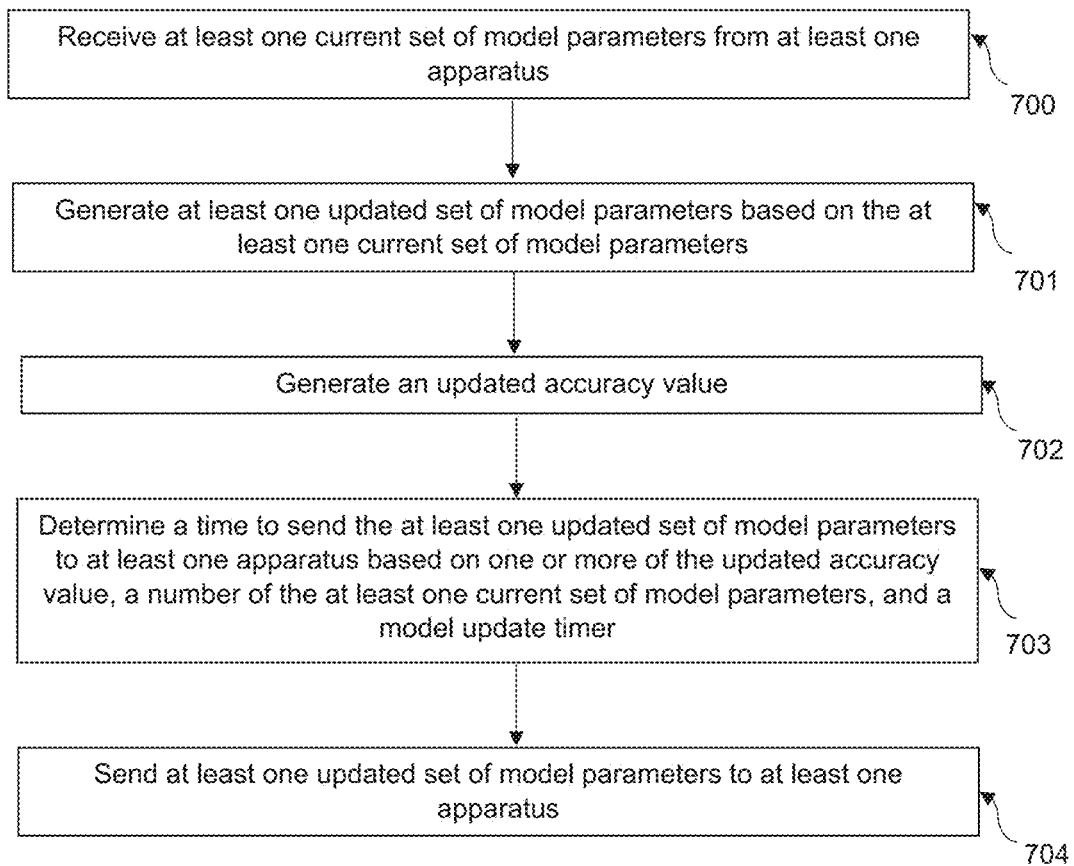
FIG. 7 is a flowchart depicting a method for use at a server, according to some embodiments.

FIG. 7 is a flowchart depicting a method for use at a server 12, according to some embodiments.

At step 700, at least one current set of model parameters is received from at least one collaborative learning apparatus 100-*n*.

At step 701, at least one updated set of model parameters is generated based on the at least one current set of model parameters, according to any preceding feature described in relation with FIG. 2 to FIG. 5. One updated set of model parameters is the update of one current set of model parameters.

At step 702, one updated accuracy value representing the accuracy of the machine learning model configured with one updated set of model parameters is generated.

At step 703, a time to send the at least one updated set of model parameters to at least one collaborative learning apparatus 100-*n* is determined based on one or more of the updated accuracy value(s), the number of the at least one current sets of model parameters, and a model update timer.

At step 704, at least one updated set of model parameters is sent to at least one collaborative learning apparatus 100-*n* at the time determined in step 703.

It should be appreciated by those skilled in the art that any functions, engines, block diagrams, flow diagrams, state transition diagrams and/or flowcharts herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or apparatus, whether such computer or processor is explicitly shown.

Each described computation function, block, step can be implemented in hardware, software, firmware, middleware, microcode, or any suitable combination thereof. If implemented in software, the computation functions, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable apparatus, create the means for implementing the functions described herein.

When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause an apparatus to perform the necessary tasks. Additionally, the processor, memory, and example algorithms, encoded as computer program code, serve as means for providing or causing performance of operations discussed herein.

In the present description, block denoted as "means configured to" perform a certain function or "means for" performing a certain function shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used in this application, the term "circuit" or "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation."

This definition of "circuit" or "circuitry" applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device. The term circuitry may cover digital signal processor (DSP) hardware, network processor, application specific integrated circuit (ASIC), field programmable gate array (FPGA), etc.

The "circuit" or "circuitry" may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The "circuit" or "circuitry" may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via a radio network (e.g., after being down-converted by radio transceiver, for example).

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing, or carrying instruction(s) and/or data.

The methods and devices described herein may be implemented by various means. For example, these techniques may be implemented in hardware, software, or a combination thereof. For a hardware implementation, the processing elements of the different apparatuses operating in the system 1 can be implemented for example according to a hardware-only configuration (for example in one or more FPGA, ASIC, or VLSI integrated circuits with the corresponding memory) or according to a configuration using both VLSI and Digital Signal Processor (DSP).

Figure 8:
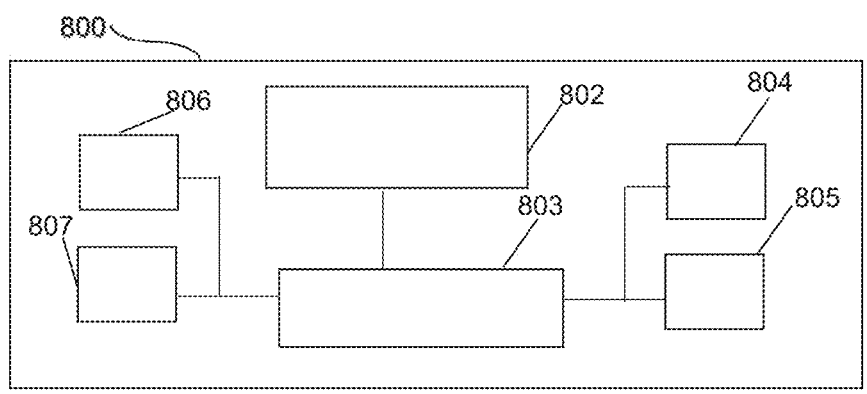
FIG. 8 is an exemplary hardware structure of a collaborative learning apparatus, according to some embodiments.

FIG. 8 is a block diagram illustrating an exemplary hardware/software architecture of a collaborative learning apparatus 800, according to some embodiments. The architecture may include various computing, processing, storage, communication, and displaying units comprising:
communication circuitry 802 comprising a transceiver (e.g., wireless, or optical transceiver) configured to connect the collaborative learning apparatus 800 through corresponding links to ensure transmission/reception of data and/or signals. The communication circuitry may support various network and air interface such as wired, optical fiber, and wireless networks;
a processing unit 803 configured to execute the computer-executable instructions to run the methods and algorithms according to the various embodiments and perform the various required functions of the collaborative learning apparatus 800 and any functionalities required to enable the collaborative learning apparatus 800 to operate according to the various embodiments. The processing unit 803 may be a general-purpose processor, a special purpose processor, a DSP, a plurality of microprocessors, a controller, a microcontroller, an ASIC, an FPGA circuit, any type of integrated circuit, and the like;

a power source 804 that may be any suitable device providing power to the collaborative learning apparatus 800 such as dry cell batteries, solar cells, and fuel cells;

a storage unit 805 possibly comprising a random-access memory (RAM) or a read-only memory used to store data (e.g., input data and output validation data) and any data required to perform the functionalities of the collaborative learning apparatus 800 according to the embodiments;

Input peripherals 807;

Output peripherals 808 comprising communication means such as displays enabling for example man-to-machine interaction between the collaborative learning apparatus 800 and an administrator for configuration and/or maintenance purposes.

The architecture of the collaborative learning apparatus 800 may further comprise one or more software and/or hardware units configured to provide additional features, functionalities and/or network connectivity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

For example, the program comprises instructions stored on the computer-readable storage medium that, when executed by a processor, cause the processor to:

generate at least one updated set of model parameters based on at least one current set of model parameters received from at least one apparatus 100-$n$, the at least one updated set of model parameters being parameters of a machine learning model and an update of the at least one current set of model parameters;

send the at least one updated set of model parameters to at least one apparatus 100-$n$.

In another example, the program comprises instructions stored on the computer-readable storage medium that, when executed by a processor, cause the processor to:

send a current set of model parameters to a server 12, the current set of model parameters being parameters of a trained machine learning model;

configure the trained machine learning model with an updated set of model parameters received from the server 12, the updated set of model parameters being an update of the current set of model parameters.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various steps illustrated and/or described may be performed in the sequence illustrated and/or described, in other sequences, in parallel, or omitted. Likewise, the order of the above-described processes may be changed.

The invention claimed is:

1. A server comprising: at least one processor, and at least one memory storing instructions that, when executed by the at least one processor, cause the server at least to perform:

generating at least one updated set of model parameters based on at least one current set of model parameters received from at least one apparatus, the at least one updated set of model parameters being parameters of a machine learning model and an update of the at least one current set of model parameters, and the at least one updated set of model parameters being generated according to a Gaussian model;

sending the at least one updated set of model parameters to at least one apparatus and enabling prevention of tampering with inference data.

2. The server of claim 1 configured to perform generating the at least one updated set of model parameters further configured to perform a centralized processing based on two or more current sets of model parameters received from two or more corresponding apparatuses.

3. The server of claim 2 further configured to group the two or more apparatuses into one or more clusters, wherein the server are configured to generate at least one updated set of model parameters per cluster of apparatuses.

4. The server of claim 2, further configured to generate the at least one updated set of model parameters by applying a weighted average to the two or more current sets of model parameters using two or more weighting coefficients, wherein the server is further configured to generate the weighting coefficient applied to one set of current model parameters received from one apparatus based on one or more of an accuracy value, analytics data, and a number of training samples received from the one apparatus, wherein the accuracy value represents an accuracy of the machine learning model configured with the one set of current model parameters and trained based on the training samples, wherein the analytics data are obtained from inference data generated at output of two or more trained machine learning models configured respectively with the two or more current sets of model parameters.

5. The server of claim 3, further configured to generate the at least one updated set of model parameters by applying a weighted average to the two or more current sets of model parameters using two or more weighting coefficients, wherein the server is further configured to generate the weighting coefficient applied to one set of current model parameters received from one apparatus based on one or more of an accuracy value, analytics data, and a number of training samples received from the one apparatus, wherein the accuracy value represents an accuracy of the machine learning model configured with the one set of current model parameters and trained based on the training samples, wherein the analytics data are obtained from inference data generated at output of two or more trained machine learning models configured respectively with the two or more current sets of model parameters.

6. The server of claim 1 configure to generate an updated accuracy value representing an accuracy of the machine learning model configured with the at least one updated set of model parameters, further configured to determine a time to send the at least one updated set of model parameters to the at least one apparatus based on one or more of the updated accuracy value, a number of the at least one current set of model parameters, and a model update timer.

7. The server of claim 1 configured to generate the at least one updated set of model parameters for at least one machine learning use-case, further configured to send the at least one updated set of model parameters to at least one apparatus in response to a subscription request sent by the at least one apparatus to receive one or more updated sets of model parameters for the machine learning use-case.

8. An apparatus comprising: at least one processor, and at least one memory storing instructions that, when executed by the at least one processor, cause the apparatus at least to perform:
sending a current set of model parameters to a server, the current set of model parameters being parameters of a trained machine learning model;
configuring the trained machine learning model with an updated set of model parameters received from the server and enabling prevention of tampering with inference data, the updated set of model parameters being an update of the current set of model parameters, and the at least one updated set of model parameters being generated according to a Gaussian model.

9. The apparatus of claim 8, further configured to:
obtain an accuracy value representing an accuracy of the trained machine learning model configured with the current set of model parameters;
determine a time for sending the current set of model parameters to the server based on one or more of the accuracy value and a model update timer.

10. The apparatus of claim 9 configured to obtain the current set of model parameters from a training of a machine learning model performed based on training samples, further configured to send to the server at least one of: the accuracy value, analytics data, one or more formats of input data, a feature extraction algorithm, one or more data pre-processing techniques, and a number of the training samples used for training the machine learning model, wherein the analytics data are obtained from inference data generated by running the trained machine learning model configured with the current set of model parameters using the input data.

11. The apparatus of claim 8, wherein the machine learning model is implemented for a machine learning use-case, the at least one processor and the at least one memory storing instructions, when executed by the at least one processor, are further configured to cause the apparatus to send a subscription request to receive from the server at least one updated set of model parameters for the machine learning use-case.

12. The apparatus of claim 8, wherein the apparatus is a distributed self-organizing network apparatus operable at a wireless edge of a wireless communication system, wherein the at least one processor and the at least one memory storing instructions, when executed by the at least one processor, are further configured to cause the apparatus to perform one or more operations by running the trained machine learning model configured with the updated set of model parameters, an operation being a radio access network optimization operation at the wireless communication system.

13. The apparatus of claim 11, wherein the subscription request comprises an identifier of a use-case specific classification algorithm.

14. The server of claim 7, wherein the subscription request comprises an identifier of a use-case specific classification algorithm.

15. The apparatus of claim 8, wherein the apparatus is an Internet of Things device.

\* \* \* \* \*